US010277560B2

(12) United States Patent
Saputra et al.

(10) Patent No.: US 10,277,560 B2
(45) Date of Patent: Apr. 30, 2019

(54) APPARATUS, METHOD, AND SYSTEM FOR ACCESSING AND MANAGING SECURITY LIBRARIES

(71) Applicant: Samsung Electronics Co., Ltd., Suwon-si, Gyeonggi-do (KR)

(72) Inventors: Sia Jeffry Saputra, Sunnyvale, CA (US); Naveen Bobbili, San Jose, CA (US); Shibani Medhekar, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 14/619,697

(22) Filed: Feb. 11, 2015

(65) Prior Publication Data

US 2015/0244686 A1 Aug. 27, 2015

Related U.S. Application Data

(60) Provisional application No. 61/943,430, filed on Feb. 23, 2014.

(51) Int. Cl.
*H04L 29/06* (2006.01)
*H04L 29/08* (2006.01)
*G06F 21/60* (2013.01)

(52) U.S. Cl.
CPC ........ *H04L 63/0428* (2013.01); *G06F 21/602* (2013.01); *H04L 67/10* (2013.01); *G06F 2221/2101* (2013.01); *H04L 63/0823* (2013.01)

(58) Field of Classification Search
CPC .......................... H04L 63/0428; H04L 67/10; H04L 2209/127
See application file for complete search history.

(56) References Cited

U.S. PATENT DOCUMENTS

| 6,253,257 | B1* | 6/2001 | Dundon | G06F 9/44521 719/328 |
| 6,839,437 | B1 | 1/2005 | Crane et al. | |
| 7,296,149 | B2* | 11/2007 | Hiltgen | G06F 21/34 380/30 |
| 7,296,160 | B2* | 11/2007 | Hiltgen | G06F 21/34 380/28 |
| 9,111,089 | B1* | 8/2015 | Bhatia | G06F 21/00 |
| 2002/0120842 | A1* | 8/2002 | Bragstad | G06F 21/602 713/156 |
| 2003/0177353 | A1* | 9/2003 | Hiltgen | G06F 21/34 713/161 |
| 2008/0181399 | A1* | 7/2008 | Weise | G06F 21/72 380/44 |
| 2010/0242097 | A1* | 9/2010 | Hotes | G06F 9/468 726/4 |

(Continued)

FOREIGN PATENT DOCUMENTS

WO  2006/072692 A1  7/2006

*Primary Examiner* — Linglan E Edwards
(74) *Attorney, Agent, or Firm* — Jefferson IP Law, LLP

(57) ABSTRACT

An apparatus and method for performing a cryptography function on an electronic device are provided. The method includes executing an application on the electronic device, requesting, by the application, to use a security library, loading the security library in a remote process on the electronic device, and communicating, by the application, with the security library in the remote process.

23 Claims, 7 Drawing Sheets

(56) References Cited

U.S. PATENT DOCUMENTS

| | | | |
|---|---|---|---|
| 2011/0145596 A1* | 6/2011 | Jordan | G06F 12/1441 |
| | | | 713/189 |
| 2012/0137372 A1* | 5/2012 | Shin | H04L 9/088 |
| | | | 726/26 |
| 2013/0097425 A1* | 4/2013 | Almandos | G06F 21/602 |
| | | | 713/175 |
| 2014/0075496 A1* | 3/2014 | Prakash | G06F 21/6218 |
| | | | 726/1 |

* cited by examiner

APPARATUS, METHOD, AND SYSTEM FOR ACCESSING AND MANAGING SECURITY LIBRARIES

CROSS-REFERENCE TO RELATED APPLICATION(S)

This application claims the benefit under 35 U.S.C. § 119(e) of a U.S. Provisional application filed on Feb. 23, 2014 in the U.S. Patent and Trademark Office and assigned Ser. No. 61/943,430, the entire disclosure of which is hereby incorporated by reference.

TECHNICAL FIELD

The present disclosure relates to an apparatus and method for managing and accessing security files in an Operating System (OS). More particularly, the present disclosure relates to an apparatus and method for manage and/or monitor the access to a security file and/or the operations associated with the security file.

BACKGROUND

As a result of the increasing rate of malicious attacks on electronic devices, current development focuses on improving security of electronic devices. In particular, development focuses on improving the security of software loaded on electronic devices. As part of the security for electronic devices, an application and/or an Operating System (OS) (e.g., Android) may use various security files to assist with security procedures such as authentication and/or access control.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus, system, and method for managing cryptography libraries on an electronic device. Another aspect of the present disclosure is to provide an apparatus, system, and method for accessing cryptography libraries on an electronic device.

In accordance with an aspect of the present disclosure, a method for performing a cryptography function on an electronic device is provided. The method includes executing an application on the electronic device, requesting, by the application, to use a security library, loading the security library in a remote process on the electronic device, and communicating, by the application, with the security library in the remote process.

In accordance with another aspect of the present disclosure, an electronic device is provided. The electronic device includes a storage unit having an application and one or more security libraries installed thereon, one or more processors configured to execute the application, wherein the one or more processors receive a request from the application to use at least one of the one or more security libraries, load the at least one of the one or more security libraries in a remote process, and wherein the application communicates the at least one of the one or more security libraries in a remote process.

In accordance with another aspect of the present disclosure, a method for configuring a cryptography function of an electronic device is provided. The method includes setting, by an administrator of a network, an association between one or more security libraries and one or more applications installed on an electronic device registered with the network, and configuring, by the administrator, the electronic device such that an application installed on the electronic device uses a corresponding security library according to the association between one or more security libraries and one or more applications installed on an electronic device.

In accordance with another aspect of the present disclosure, an electronic device for use as an administrator of a network is provided. The electronic device includes a storage unit storing information relating to one or more security libraries and one or more applications installed on an electronic device registered with the network, a communication unit configured to communicate with the electronic devices registered with the network, and one or more processors configured to set an association between at least one of the one or more security libraries and at least one of the one or more applications installed on the electronic device registered with the network, and to configure the electronic device such that an application installed on the electronic device uses a corresponding security library according to the association between one or more security libraries and one or more applications installed on an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAIL DESCRIPTION

Figure 1:
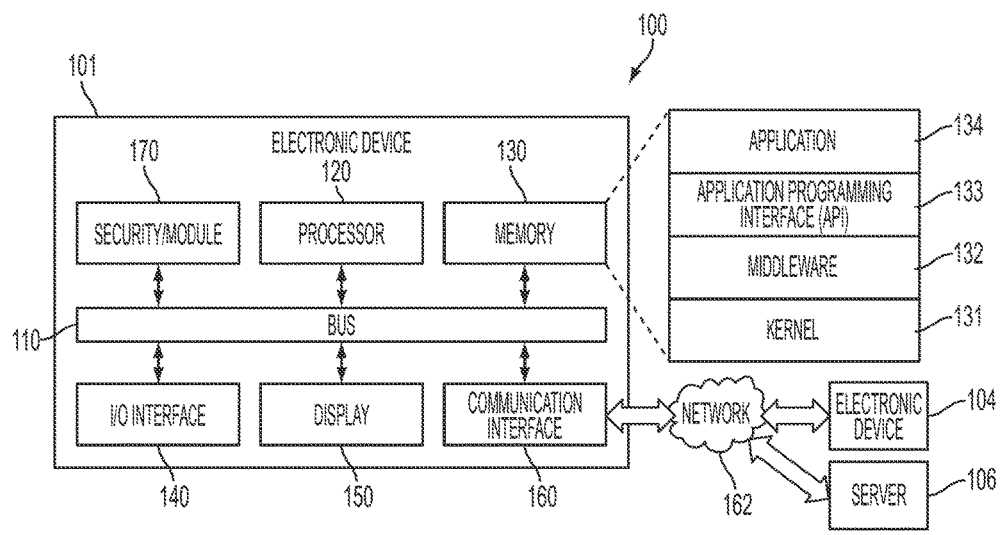
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed descriptions with reference to the accompanying drawings are provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus, a system, and a method for managing access to a security module. For example, various embodiments of the present disclosure relate to an apparatus, a system, and a method for managing access to an Application Programming Interface (API) used in performing authentication operations and/or other security operations. As an example, various embodiments of the present disclosure relate to an apparatus and method for managing access to an API that holds cryptographic information and/or performs cryptographic operations or functions. Various embodiments of the present disclosure relate to an apparatus and method for managing access to a Cryptographic Token Interface (Cryptoki) (e.g., a Public-Key Cryptography Standards (PKCS) 11).

Various embodiments of the present disclosure include an apparatus, a system, and a method for managing access to the security module. For example, various embodiments of the present disclosure include an apparatus, a system, and a method for configuring and managing cryptographic information (e.g., cryptography libraries, and/or the like) that is stored on the electronic device. According to various embodiments of the present disclosure, the cryptographic information (e.g., cryptography libraries, and/or the like) may be stored on the electronic device. The cryptographic information (e.g., cryptography libraries, and/or the like) may be stored in a secure zone of the electronic device. For example, the cryptographic information may be stored in a secure zone of the electronic device that prevents or otherwise prohibits entities (e.g., applications) outside the secure zone of the electronic device from modifying or otherwise using the cryptographic information (e.g., cryptography libraries, and/or the like).

The electronic device may store information relating to associations between entities (e.g., applications, and/or the like) and certain cryptographic information (e.g., cryptography libraries, and/or the like). For example, the electronic device may store a mapping of which cryptographic libraries that certain entities (e.g., applications, and/or the like) are to use for performing cryptographic functions. As an example, the electronic device may store the mapping of which cryptographic libraries that certain entities (e.g., applications, and/or the like) are to use for performing cryptographic functions in a look up table. According to various embodiments of the present disclosure, the electronic device may store the mapping of which cryptographic libraries that certain entities (e.g., applications, and/or the like) are to use for performing cryptographic functions in a secure zone of the electronic device.

Various embodiments of the present disclosure include an apparatus, a system, and a method for monitoring access to a security module. For example, various embodiments of the present disclosure relate to an apparatus, a system, and a method for monitoring access to an Application Programming Interface (API) used in performing authentication operations and/or other security operations. As an example, various embodiments of the present disclosure relate to an apparatus, a system, and a method for monitoring (or otherwise managing) access to an API that holds cryptographic information and/or performs cryptographic operations or functions. Various embodiments of the present disclosure relate to an apparatus, a system, and a method for monitoring access to a Cryptoki.

According to the related art, Cryptoki libraries may be configured to be an interface between an application and cryptography modules or devices. For example, a Cryptoki general model may be implemented as a library that is linked directly to an application. As another example, the Cryptoki general model may be implemented as a library that is linked dynamically to an application.

According to the related art, to Cryptoki, an application includes a single address space and all threads of the control running in the application. For example, an application may become a Cryptoki application by calling the Cryptoki from one of the threads of the application.

As an example, according to the related art, each application may be configured to load a selected Cryptoki library. Each application may directly use the selected Cryptoki library. For example, each application may be configured to load a different selected Cryptoki library and may directly use the corresponding selected Cryptoki library. Because a selected Cryptoki library may be made or configured by a third party (e.g., by another vendor), another entity (e.g., an enterprise) may have limited control associated with controlling token access or a cryptography application. For example, a Mobile Device Management (MDM) entity may have limited control to control whether token access or a cryptography operation is allowed for a particular application. In addition, each application must be manually configured to use a selected Cryptoki library. Accordingly, if the selected Cryptoki library changes, each application that was configured to use the previous selected Cryptoki library must be reconfigured to use the newly selected Cryptoki library.

According to various embodiments of the present disclosure, an entity may control a sandboxed process (e.g., a remote process) in which an application interacts with a Cryptoki. For example, the entity may control a sandbox environment in which the application interacts with the Cryptoki. According to various embodiments of the present disclosure, the management entity (e.g., an enterprise such as the MDM entity, and/or the like) may control a sandboxed process in which the application interacts with the Cryptoki. The sandboxed process in which the application interacts with a Cryptoki may correspond to operating the Cryptoki in an environment (e.g., a secure zone) that is isolated from the environment in which the application is operating.

According to various embodiments of the present disclosure, a management entity (e.g., the MDM entity) may manage and/or monitor access to a Cryptoki. According to various embodiments of the present disclosure, the management entity may manage, monitor, and/or control operations (e.g., the behavior of) permitted or allowed Cryptoki access/control.

According to various embodiments of the present disclosure, an application may interact with a Cryptoki library which resides in a remote process. The remote process may be executed in a secure operating environment of an electronic device (e.g., in a secure zone of the electronic device).

According to various embodiments of the present disclosure, an application A which wants to use Cryptoki functionality will request the remote process to load a particular Cryptoki library.

According to various embodiments of the present disclosure, a remote process may load the corresponding Cryptoki library requested by application A. The remote process may load the corresponding Cryptoki library requested by application A in a secure operating environment of an electronic device (e.g., in a secure zone of the electronic device). In response to receiving a request to use Cryptoki functionality, the remote process may determine which Cryptoki library is to be used for the application A. For example, the remote process may use a look-up table or other mapping of Cryptoki libraries to applications to determine the appropriate Cryptoki library to load. The association between Cryptoki libraries and applications (e.g., mapping of which Cryptoki libraries to load for use by a specific application) may be managed or otherwise controlled by a management entity (e.g., an enterprise, or the like).

According to various embodiments of the present disclosure, application A will communicate with the Cryptoki library which is resides in remote process through secured communication (e.g., through a secured IPC mechanism).

According to various embodiments of the present disclosure, an MME entity may mange the remote process that holds the Cryptoki.

According to various embodiments of the present disclosure, a management entity may control whether a corresponding application is allowed to access the corresponding Cryptoki remote process. For example, according to various embodiments of the present disclosure, a management entity would be able to control if the corresponding application allowed accessing the corresponding Cryptoki remote process.

According to various embodiments of the present disclosure, a remote process will mimic the behavior of application so Cryptoki will behave as being loaded in the corresponding application process.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a security module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the security module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the security module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the security module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the security module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

Figure 2:
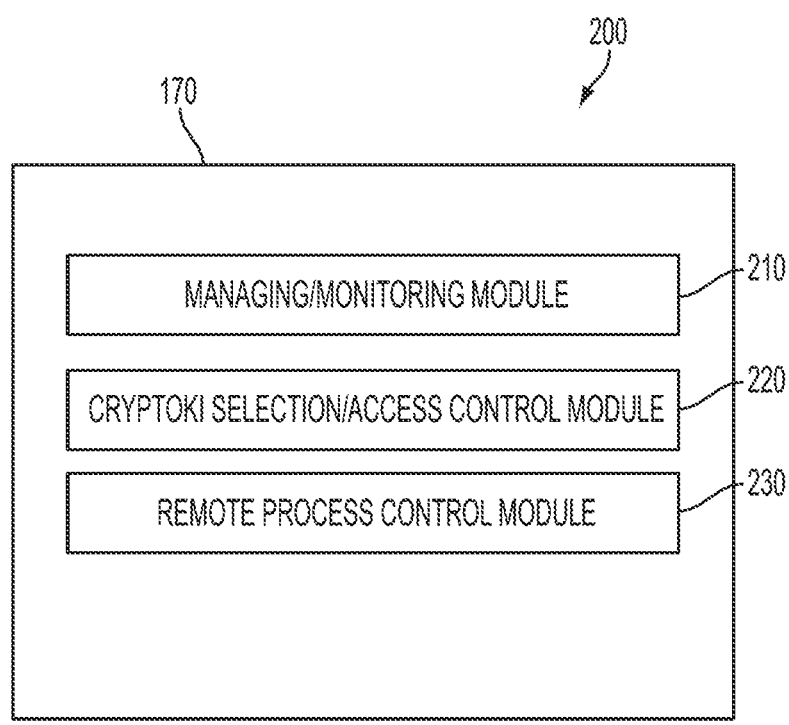
FIG. 2 illustrates a block diagram of a security module according to various embodiments of the present disclosure.

The security module 170 may, for example, process at least a part of information received from other components (e.g., the processor 120, the memory 130, the I/O interface 140, the communication interface 160, and/or the like), and provide various information, services, and/or the like to the user in various manners. For example, the security module 170 may control via the processor 120 or independently at least some of the functions of the electronic device 101 to communicate or connect to another electronic device (e.g., the electronic device 104, the server 106, and/or the like). The security module 170 may provide a secure operating environment in which a cryptography library (e.g., a Cryptoki library) may be loaded to support a cryptography function of an application operating on the electronic device. For example, the security module 170 may provide a secure operating environment in which one or more Cryptoki libraries corresponding to an application may be loaded in response to a request from the application (or otherwise in response to an indication that the application is to perform a cryptography function). FIG. 2 will provide additional information regarding the security module 170.

FIG. 2 illustrates a block diagram of security module according to various embodiments of the present disclosure.

Referring to FIG. 2, a secure zone 200 may include the security module 170 illustrated in FIG. 1. According to various embodiments of the present disclosure, the security module 170 may reside outside the secure zone 200.

According to various embodiments of the present disclosure, the secure zone 200 may be an area or environment of an electronic device with additional security relative to a normal zone of the electronic device. For example, an electronic device may include a normal operating environment (e.g., a normal zone) and a secure operating environment (e.g., a secure zone 200). The secure zone 200 may have a hardware guarantee that integrity of the applications, data, and/or the like within the secure zone 200 are not compromised.

According to various embodiments of the present disclosure, only preloaded applications may be loaded in the secure zone 200. For example, only applications, data, and/or the like that are installed by a manufacturer (e.g., an Original Equipment Manufacturer (OEM) manufacturer) of an electronic device may be executed in the secure zone 200 thereof. In other words, applications, data, and/or the like that are not installed by the OEM manufacturer may not be executed in the secure zone 200 (e.g., other entities may not have the requisite permissions to install applications, data, and/or the like in the secure zone 200). According to various embodiments of the present disclosure, new information may be stored in the secure zone 200, and such new information may be used by preexisting applications, and/or the like in the secure zone 200. For example, a credential may be stored in the secure zone 200, and an authentication application, or the like, which was installed in the secure zone 200 by the OEM manufacturer, may use the information newly stored in the secure zone 200. As another example, cryptography information (e.g., a cryptography library, and/or the like) may be installed in the secure zone 200, and a cryptography application, and/or the like, which was installed in the secure zone 200 may load the cryptography information (e.g., a cryptography library, and/or the like).

The cryptography information may be loaded in the secure zone 200 to isolate the cryptography information from the applications loaded on the electronic device that are attempting to perform a cryptography process or function. For example, if an application loaded on the electronic device wants to perform a cryptography function, then the application may submit a request for cryptographic information to the secure zone 200. In response, the secure zone 200 may load an applicable cryptography library (e.g., a cryptography library that is mapped to the application, or the like) and communicate with the application so as to perform the cryptography processes within the secure zone 200.

The security module 170 may include a managing/monitoring module 210, a Cryptoki selection/access control module 220, a Remote Process control module 230, and/or the like.

According to various embodiments of the present disclosure, the managing/monitoring module 210 may be configured to monitor and/or manage access to a Cryptoki. The managing/monitoring module 210 may be configured to manage which cryptography libraries (e.g., Cryptoki) are loaded on the electronic device. The managing/monitoring module 210 may be configured to manage which cryptography libraries (e.g., Cryptoki) are being used for a particular application loaded on the electronic device.

According to various embodiments of the present disclosure, an enterprise (e.g., an enterprise network, an MDM, and/or the like) may communicate with the managing/monitoring module 210 to manage the cryptography libraries (e.g., Cryptoki) installed on the electronic device. For example, the managing/monitoring module 210 may be configured to communicate with an enterprise to allow the enterprise to configure the cryptography libraries (e.g., Cryptoki) installed on the electronic device. The managing/monitoring module 210 may be configured to install one or more cryptography libraries (e.g., Cryptoki) on the electronic device based on a request (or a command) from an enterprise. The managing/monitoring module 210 may be configured to associate one or more installed cryptography libraries (e.g., Cryptoki) with a corresponding one or more applications installed on the electronic device (e.g., such that if one of the one or applications performs a cryptography function, the corresponding one or more cryptography libraries associated with the respective application is loaded). For example, the managing/monitoring module 210 may be configured to associate one or more installed cryptography libraries (e.g., Cryptoki) with a corresponding one or more applications installed on the electronic device based on a request (or a command) from an enterprise. According to various embodiments of the present disclosure, the managing/monitoring module 210 may be a mediator through which the enterprise may configure the electronic device to associate certain cryptographic libraries (e.g., Cryptoki) with an application installed on the electronic device.

In view of the above, if a cryptographic library, that is currently being used for applications in connection with enterprise operations, is no longer available (e.g., if a license to the cryptography library expires, and/or the like), then the enterprise may push protocols, instructions, and/or the like to electronic devices registered with the enterprise. For example, if a cryptographic library used in connection with an enterprise operation changes, then the enterprise may configured electronic devices registered therewith to use an alternative cryptographic library (e.g., that is set or otherwise selected by the enterprise).

According to various embodiments of the present disclosure, the Cryptoki selection/access control module 220 may select a Cryptoki to use. For example, the Cryptoki selection/access control module 220 may select which Cryptoki an application may access. As another example, the Cryptoki selection/access control module 220 may determine whether an application is allowed (e.g., authorized) to access a desired Cryptoki (e.g., a Cryptoki library). In contrast to the related art in which the application determines which Cryptoki to use to perform a cryptography function, various embodiments of the present disclosure include a Cryptoki selection/access control module 220 which selects the Cryptoki to be used for a specific application.

According to various embodiments of the present disclosure, the Cryptoki selection/access control module 220 may select the Cryptoki to be used for a specific application based on a policy communicated to the electronic device from an enterprise. For example, the enterprise may define which Cryptoki are to be used for an application. The Cryptoki selection/access control module 220 may select the Cryptoki to be used for a specific application according to mapping of one or more Cryptoki (e.g., cryptography libraries, and/or the like) to an application that may be configured by the enterprise.

In contrast to the related art in which an application may be configured to load a specific Cryptoki, various embodiments of the present disclosure include an application which is configured to call the security module 170 to load a corresponding Cryptoki. Accordingly, even if the Cryptoki corresponding to a particular application may change, the application does not need to be reconfigured for use with the new Cryptoki. Rather, the application may continue to call the security module 170 and the security module 170 will load the appropriate Cryptoki (e.g. according to policies, rules, and/or the like that may be configurable by an enterprise).

According to various embodiments of the present disclosure, the Remote Process control module 230 may control a remote process in which an application may access a Cryptoki. For example, in response to a request from an application to perform a cryptography function, the Remote Process control module 230 may load the selected Cryptoki (e.g., selected by the Cryptoki selection/access control module 220). The Remote Process control module 230 may load the selected Cryptoki and may interface with the corresponding application to facilitate performing the desired cryptography function. For example, the application may communicate with the selected Cryptoki that is loaded by the Remote Process control module 230 through s secure Inter-Process Communication (IPC) mechanism. The Remote Process control module 230 may load the selected Cryptoki and interface with the application The Remote Process control module 230 may load the selected Cryptoki in response to a request from the application (or otherwise in response to an indication that the application is to perform a cryptography function). The Remote Process control module 230 may load the selected Cryptoki may be loaded in a secure operating environment of the electronic device (e.g., the secure zone 200) to isolate the cryptography information from the applications loaded on the electronic device that are attempting to perform a cryptography process or function.

Figure 3A:
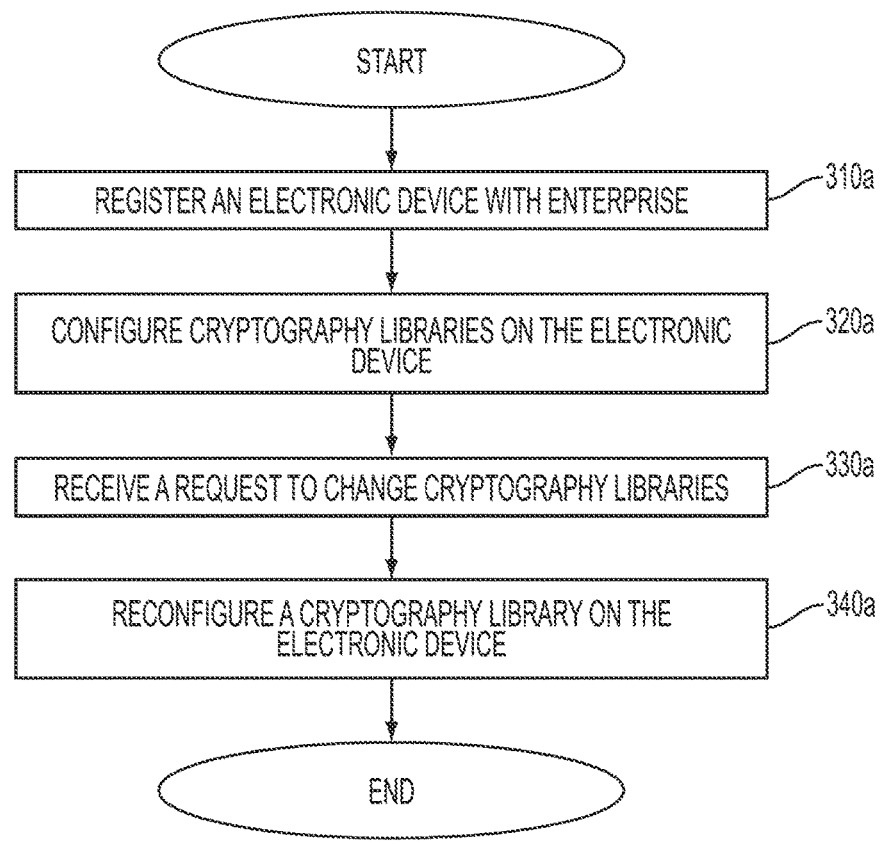
FIG. 3A illustrates a flowchart for configuring a cryptography function of an electronic device from an enterprise according to various embodiments of the present disclosure.

FIG. 3A illustrates a flowchart for configuring a cryptography function of an electronic device from an enterprise according to various embodiments of the present disclosure.

Referring to FIG. 3A, at operation 310a, an electronic device is registered with an enterprise. For example, an administrator of the enterprise (e.g., an enterprise network, computer, server, and/or the like) may register the electronic device.

At operation 320a, the cryptography libraries (e.g., Cryptoki, and/or the like) on the electronic device may be configured. The enterprise (e.g., an administrator thereof) may configure a policy, a rule, a setting, and/or the like that indicates which cryptography libraries are to be used for a particular application. For example, the enterprise may define a mapping of one or more cryptography libraries to one or more applications installed on the electronic device. According to various embodiments of the present disclosure, the enterprise may push the policy, the rule, the setting, and/or the like to the electronic device. According to various embodiments of the present disclosure, the enterprise may push one or more cryptography libraries (or addresses from which the one or more cryptography libraries may be accessed) to the electronic device.

At operation 330a, the enterprise (e.g., an enterprise network, computer, server, and/or the like) may receive a request to change cryptography libraries. For example, the enterprise may receive an indication that use of a current cryptography library is no longer valid/permissible. Accordingly, the enterprise may receive a request to change cryptography libraries that are to be loaded on one or more electronic devices registered with the enterprise.

At operation 340a, the enterprise may configure one or more cryptography libraries on an electronic device registered therewith. For example, the enterprise may configure an electronic device's use of one or more cryptography libraries for an application. The enterprise may define a mapping of one or more cryptography libraries to one or more applications installed on the electronic device. The enterprise may push or otherwise communicate the mapping (or a difference between a current mapping and a previous mapping) to an electronic device registered therewith. According to various embodiments of the present disclosure, the enterprise may push the policy, the rule, the setting, and/or the like to the electronic device. According to various embodiments of the present disclosure, the enterprise may push one or more cryptography libraries (or addresses from which the one or more cryptography libraries may be accessed) to the electronic device.

Figure 3B:
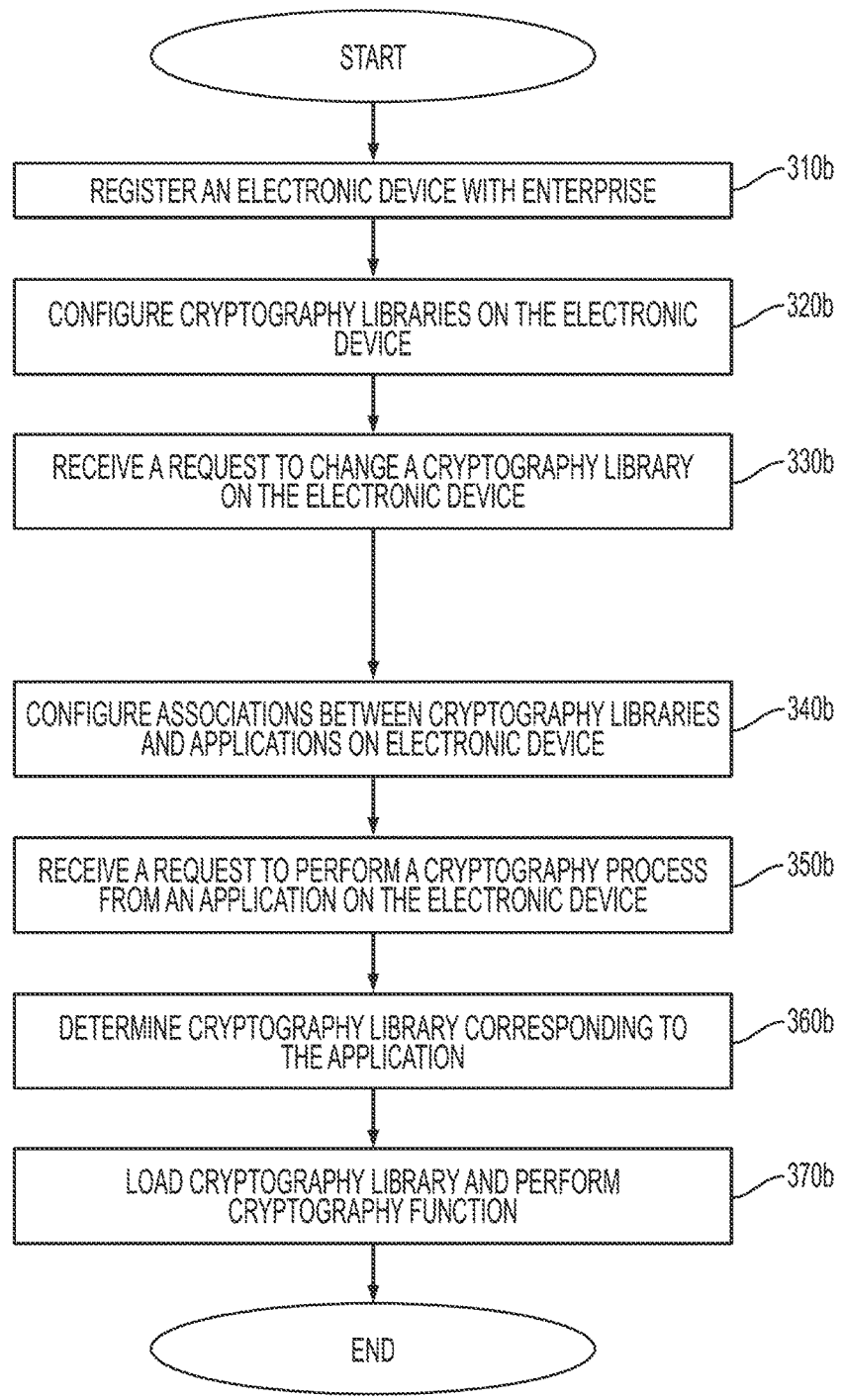
FIG. 3B illustrates a flowchart for performing a configuring a cryptography function of an electronic device according to various embodiments of the present disclosure.

FIG. 3B illustrates a flowchart for performing a configuring a cryptography function of an electronic device according to various embodiments of the present disclosure.

Referring to FIG. 3B, at operation 310b, an electronic device may be registered with an enterprise. For example, the electronic device may communicate a request to register with the enterprise (e.g., an enterprise network, computer, server, and/or the like). The electronic device and the enterprise may perform an authentication process to perform registration of the electronic device with the enterprise.

At operation 320b, one or more cryptography libraries may be configured on the electronic device. For example, the electronic device may receive, from the enterprise, a mapping of one or more cryptography libraries to one or more applications installed on the electronic device. According to various embodiments of the present disclosure, the electronic device may receive (e.g. via a push communication, and/or the like) a policy, a rule, a setting, and/or the like that indicates which cryptography libraries are to be used for a particular application. The electronic device may receive the policy, the rule, the setting, and/or the like from the enterprise. According to various embodiments of the present disclosure, the electronic device may receive one or more cryptography libraries (or addresses from which the one or more cryptography libraries may be accessed).

At operation 330b, the electronic device may receive a request to change a cryptography library installed on the electronic device. The electronic device may a new mapping (or a difference between a current mapping and a previous mapping) of one or more cryptography libraries to one or more applications installed on the electronic device. The electronic device may receive an indication that a current mapping of one or more cryptography libraries to one or more applications installed on the electronic device is no longer valid/permissible, is expired, or will expire at a certain date. According to various embodiments of the present disclosure, the electronic device may receive one or more cryptography libraries (or addresses from which the one or more cryptography libraries may be accessed) from the enterprise.

At operation 340b, associations between one or more cryptography libraries stored on the electronic device and one or more applications installed on the electronic device may be configured. For example, the electronic device may receive, from the enterprise, a mapping of one or more cryptography libraries to one or more applications installed on the electronic device. According to various embodiments of the present disclosure, the electronic device may receive (e.g. via a push communication, and/or the like) a policy, a rule, a setting, and/or the like that indicates which cryptography libraries are to be used for a particular application. For example, the enterprise may update the electronic device with current mappings of cryptography libraries for a particular application based on changes in the cryptography libraries (or use thereof).

At operation 350b, the electronic device receives a request to perform a cryptography process from an application on the electronic device. For example, the security module 170 (e.g., the managing/monitoring module 210) of the electronic device may receive a request to load a cryptography library according to a cryptography process desired by an application loaded on the electronic device. The application loaded on the electronic device may request for the security module 170 to load the corresponding cryptography library (e.g., to allow the application to perform the desired cryptography function).

At operation 360b, the electronic device determines which cryptography library corresponds to the application. For example, the electronic device may determine which cryptography library corresponds to the cryptography process to be performed by the application. The security module 170 (e.g., the Cryptoki selection/access control module 220) may determine (and select) the cryptography library corresponding to the cryptography process to be performed by the application.

At operation 370b, the electronic device may load the selected cryptography library and perform the cryptography function. For example, the security module 170 (e.g., the Remote Process control module 230) may load the selected cryptography library and communicate with the application (e.g., using a secure IPC mechanism) to allow the application to perform the cryptography function using the selected cryptography library.

Figure 4A:
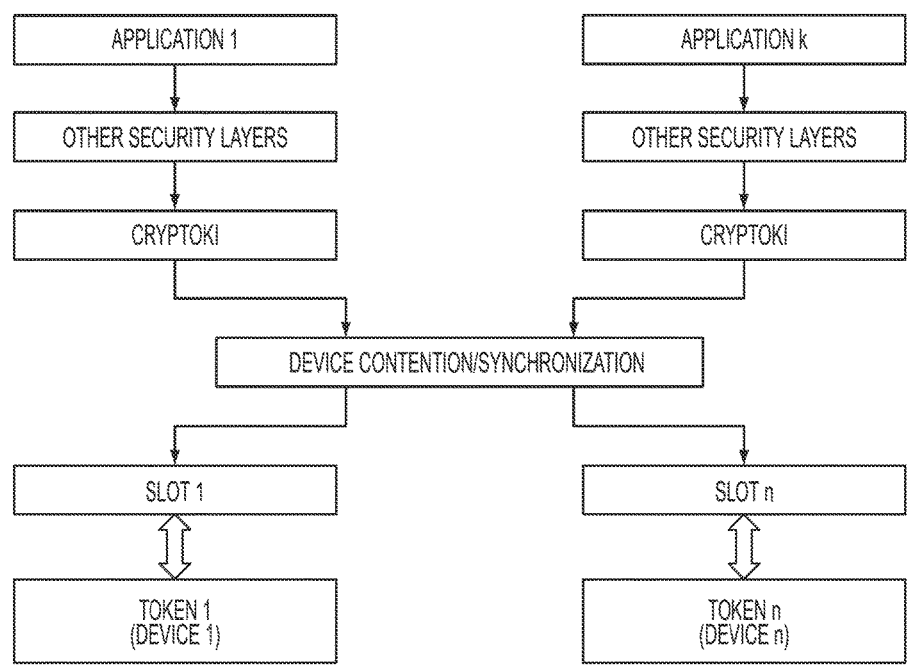
FIG. 4A illustrates a security access model according to various embodiments of the present disclosure.

FIG. 4A illustrates a security access model according to various embodiments of the present disclosure.

Referring to FIG. 3A, an application may select and access a desired Cryptoki. For example, as illustrated in FIG. 3A, the Application 1 may select and access a desired Cryptoki.

Figure 4B:
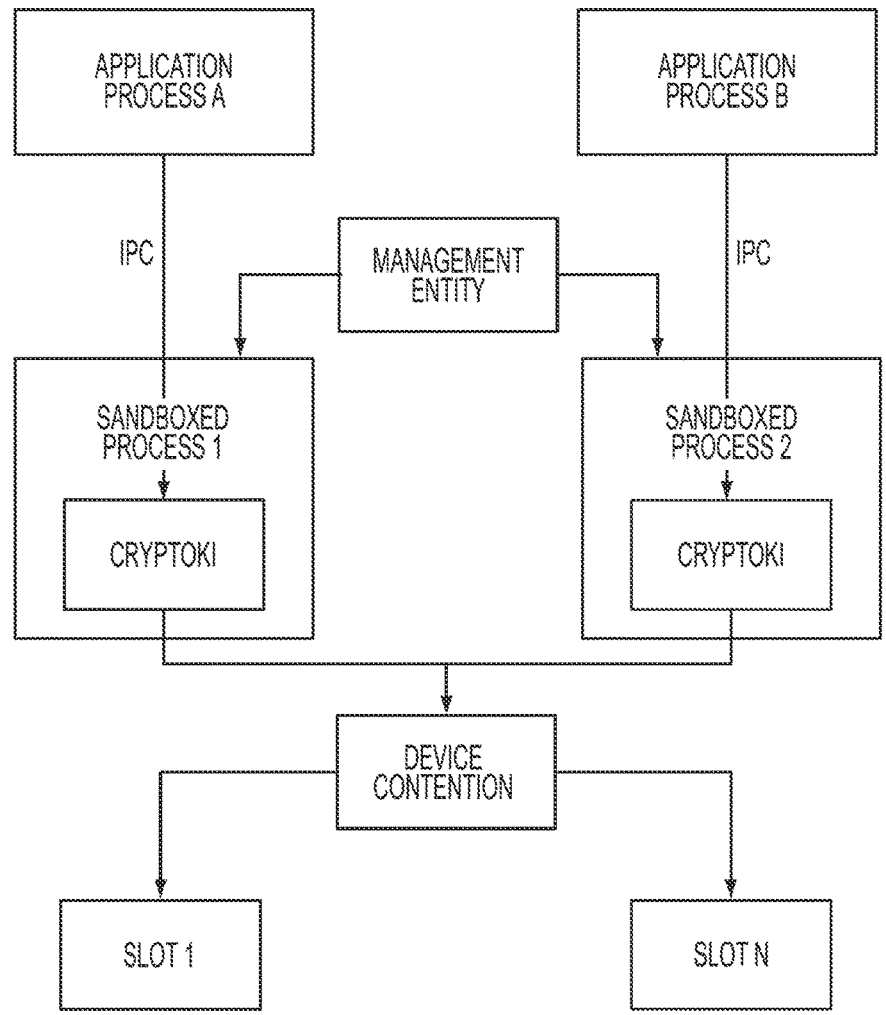
FIG. 4B illustrates a security access model according to various embodiments of the present disclosure.

FIG. 4B illustrates a security access model according to various embodiments of the present disclosure.

Referring to FIG. 4B, a management entity may control a remote environment and/or process. For example, the management entity may control the remote environment and/or process in which an application may access a Cryptoki (e.g., a Cryptoki library).

Figure 5:
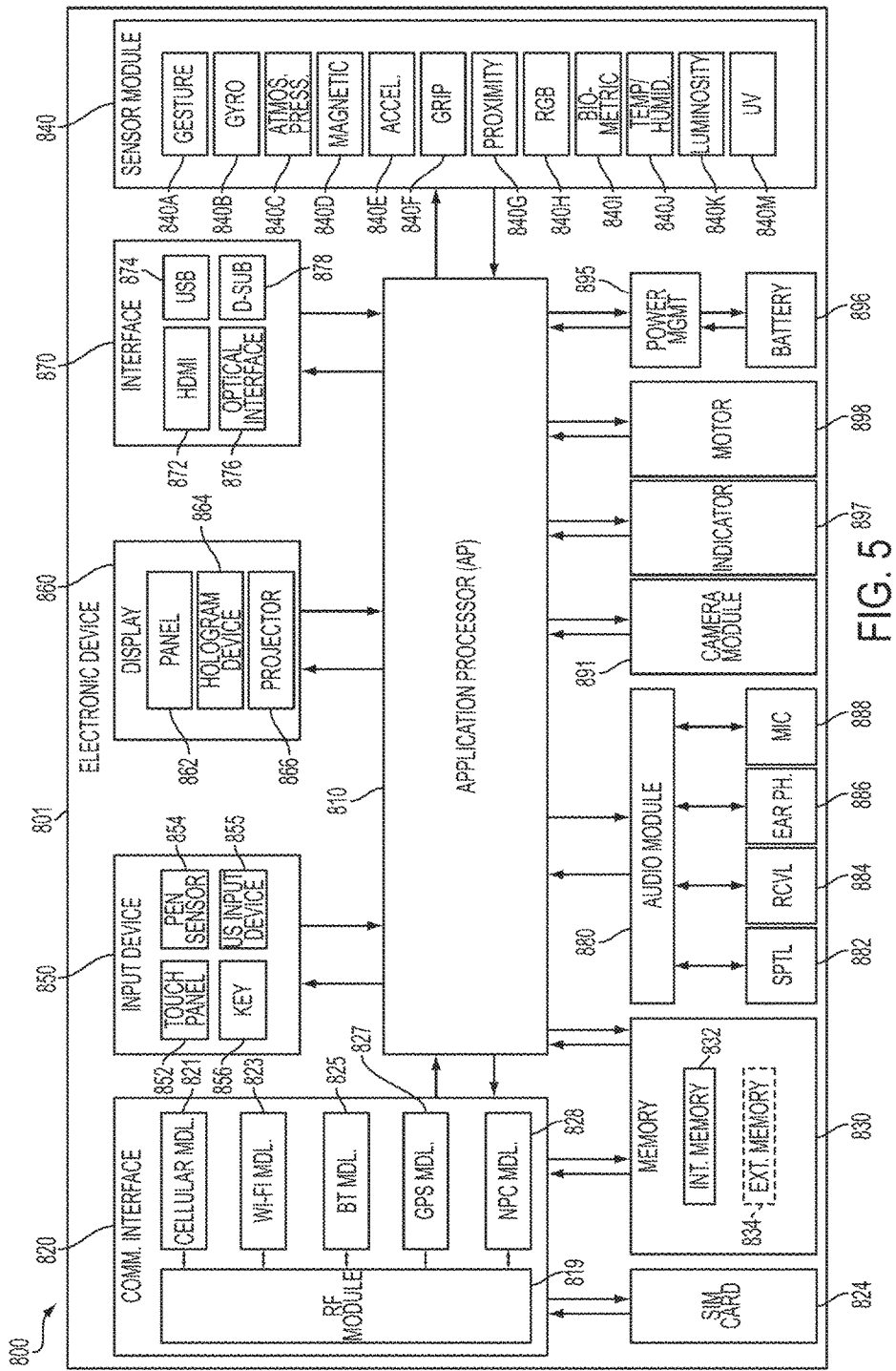
FIG. 5 illustrates a block diagram of hardware according to various embodiments of the present disclosure.

FIG. 5 illustrates a block diagram of hardware according to various embodiments of the present disclosure.

Referring to FIG. 5, hardware 801 may be, for example, a part or all of the electronic device 101. Referring to FIG. 5, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), interne service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication interface 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication interface 820, and/or the like, may store at non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding to the respective the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amp Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and/or the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to electronic device 801 via various interfaces. According to various embodiments of the present disclosure, the electronic device 801 may include recording devices (or recording media) such as, for example, Hard Disk Drives (HDD), and/or the like.

The sensor module 840 may measure physical/environmental properties detect operational states associated with electronic device 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and/or the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the electronic device 801 may receive user input from an external device (e.g., a network, computer or server) connected to the electronic device 801 using the communication module 820.

The display module 860 (e.g., display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to electronic device 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication interface 820. Additionally or alternatively, the interface 870 may include, for example, one or more interfaces for Mobile High-definition Link (MHL), Secure Digital (SD)/MultiMedia Card (MMC), Infrared Data Association (IrDA), and/or the like.

The audio module 880 may encode/decode sound into electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the electronic device 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 801 may include wired or wireless charging. The charger IC may charge a battery, may prevent excessive voltage or excessive current from a charger from entering the electronic device 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 896, and/or the like.

As an example, the battery 896 may supply power to the electronic device 801. As an example, the battery 896 may be a rechargeable battery, a solar battery, and/or the like.

The indicator 897 may indicate one or more states (e.g., boot status, message status, charge status, and/or the like) of the electronic device 801 or a portion thereof (e.g., AP 810). Motor 898 may convert an electrical signal into a mechanical vibration.

Although not shown, the electronic device 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for performing a cryptography function on an electronic device, the method comprising:
   executing an application on the electronic device;
   requesting, by the application, to use a security application programming interface (API), wherein the requesting includes information identifying the application;
   identifying the application according to the information;
   determining a Cryptoki library, among a plurality of Cryptoki libraries, mapped to the application requesting the use of the security API;
   loading the security API and the mapped Cryptoki library in a sandboxed process on the electronic device; and
   communicating, by the application, with the mapped Cryptoki library in the sandboxed process,
   wherein the determining of the Cryptoki library mapped to the application comprises:
      determining that a first Cryptoki library is mapped to the application if the application is identified, based on the information, as a first application, and
      determining that a second Cryptoki library, which is different from the first Cryptoki library, is mapped to the application if the application is identified, based on the information, as a second application, which is different from the first application, and
   wherein the determining of the Cryptoki library mapped to the application is based on a mapping of the plurality of Cryptoki libraries to applications.

2. The method of claim 1, wherein a security module receives the request to use the security API from the application.

3. The method of claim 2, wherein the request to use the security API corresponds to a request to access the mapped Cryptoki library.

4. The method of claim 1, wherein the sandboxed process mimics the behavior of the application such that the Cryptoki behaves as being loaded in a corresponding application process of the application.

5. The method of claim 1, wherein the loading of the API and the mapped Cryptoki library in the sandboxed process comprises:
   selecting the Cryptoki library corresponding to the application according to the mapping of one or more Cryptoki libraries installed on the electronic device to one or more applications installed on the electronic device.

6. The method of claim 1, further comprising:
   receiving, by the electronic device, the mapping between the Cryptoki library and the application from a network administrator.

7. The method of claim 6, wherein the receiving of the mapping between the Cryptoki library and the application comprises:
   receiving, by the electronic device, information associating at least one Cryptoki library with at least one application; and
   storing the information associating the at least one Cryptoki library with the at least one application in a security module of the electronic device.

8. An electronic device comprising:
   a storage unit having an application and one or more Cryptoki libraries installed thereon; and
   one or more processors configured to:
      execute the application,
      receive a request from the application to use a security application programming interface (API), wherein the request includes information identifying the application,
      determine, from among the one or more Cryptoki libraries, a Cryptoki library mapped to the application requesting the use of the security API, and
      load the security API and mapped Cryptoki library in a sandboxed process,
   wherein the application communicates with the mapped Cryptoki library in the sandboxed process, and
   wherein the determining of the Cryptoki library mapped to the application comprises:
      determining that a first Cryptoki library is mapped to the application if the application is identified, based on the information, as a first application, and
      determining that a second Cryptoki library, which is different from the first Cryptoki library, is mapped to the application if the application is identified, based on the information, as a second application, which is different from the first application, and
   wherein the determining of the Cryptoki library mapped to the application is based on a mapping of the one or more Cryptoki libraries to applications.

9. The electronic device of claim 8, wherein the electronic device comprises a security module configured to receive the request to use the security API from the application.

10. The electronic device of claim 9, wherein the request to use the security API corresponds to a request to access the mapped Cryptoki library.

11. The electronic device of claim 8, wherein the sandboxed process mimics the behavior of the application such that the Cryptoki behaves as being loaded in a corresponding application process of the application.

12. The electronic device of claim 8, further comprising:
   a communication unit configured to communicate with a network,
   wherein the one or more processors are further configured to receive the mapping between the Cryptoki library and the application from an administrator of the network.

13. The electronic device of claim 12, wherein the one or more processors are further configured to:
   receive information associating at least one Cryptoki library with at least one application from the administrator, and
   store the information associating the at least one Cryptoki library with the at least one application in an area of the storage unit associated with a security module of the electronic device.

14. A method for configuring a cryptography function of an electronic device, the method comprising:
   mapping, by an administrator of a network, an association between one or more Cryptoki libraries and one or more applications installed on an electronic device registered with the network; and
   configuring, by the administrator, the electronic device such that an application installed on the electronic device uses a corresponding Cryptoki library among the one or more Cryptoki libraries according to the mapped association between the one or more Cryptoki libraries and the one or more applications installed on the electronic device when the one or more applications requests use of a security application programming interface (API),
   wherein the electronic device determines the corresponding Cryptoki library mapped to the application, according to the mapped association, to be a first Cryptoki library mapped to the application if the application is identified as a first application and to be a second Cryptoki library, which is different from the first Cryptoki library, mapped to the application if the application is identified as a second application, which is different from the first application.

15. The method of claim 14, wherein the configuring of the electronic device further comprises:
communicating, by the administrator, information relating to the mapped association between at least one of the one or more Cryptoki libraries and at least one of the one or more applications installed on the electronic device registered with the network to the electronic device.

16. The method of claim 15, wherein the administrator communicates the information relating to the mapped association between the at least one of the one or more Cryptoki libraries and the at least one of the one or more applications installed on the electronic device registered with the network to the electronic device using a push scheme.

17. The method of claim 14, further comprising:
communicating, by the administrator, at least one of a Cryptoki library and an address at which the Cryptoki library may be accessed, to the electronic device.

18. The method of claim 14, further comprising:
receiving, by an enterprise administrator, an indication not to continue use of a legacy Cryptoki library.

19. An electronic device for use as an administrator of a network, the electronic device comprising:
a storage unit configured to store information relating to one or more Cryptoki libraries and one or more applications installed on an electronic device registered with the network;
a communication unit configured to communicate with the electronic device registered with the network; and
one or more processors configured to:
map an association between at least one of the one or more Cryptoki libraries and at least one of the one or more applications installed on the electronic device registered with the network, and
configure the electronic device such that an application installed on the electronic device uses a corresponding Cryptoki library according to the mapped association between the one or more Cryptoki libraries and the one or more applications installed on the electronic device when the one or more applications requests use of a security application programming interface (API),
wherein the electronic device determines the corresponding Cryptoki library mapped to the application, according to the mapped association, to be a first Cryptoki library mapped to the application if the application is identified as a first application and to be a second Cryptoki library, which is different from the first Cryptoki library, mapped to the application if the application is identified as a second application, which is different from the first application.

20. The electronic device of claim 19, wherein the one or more processors are further configured to communicate information relating to the mapped association between at least one of the one or more Cryptoki libraries and at least one of the one or more applications installed on the electronic device registered with the network to the electronic device.

21. The electronic device of claim 20, wherein the one or more processors are further configured to communicate the information relating to the mapped association between the at least one of the one or more Cryptoki libraries and the at least one of the one or more applications installed on the electronic device registered with the network to the electronic device using a push scheme.

22. The electronic device of claim 19, wherein the one or more processors are further configured to communicate at least one of a Cryptoki library and an address at which the Cryptoki library may be accessed, to the electronic device.

23. The electronic device of claim 19, wherein the one or more processors are further configured to receive an indication not to continue use of a legacy Cryptoki library.

* * * * *